July 21, 1942.   F. G. HODSDON   2,290,239
MILKER-CLAW CONSTRUCTION
Filed Feb. 28, 1940
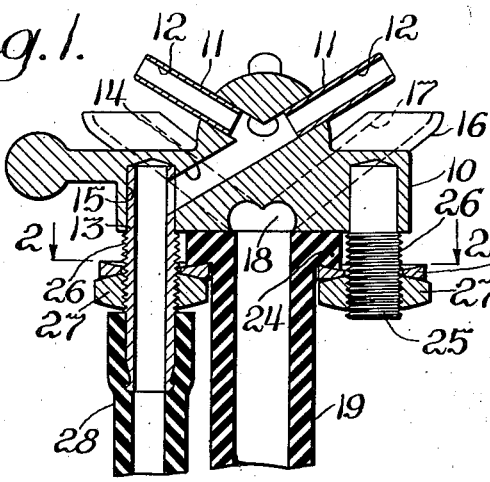
Inventor
Floyd G. Hodsdon
By Paul O. Pippel
Atty.

Patented July 21, 1942

2,290,239

UNITED STATES PATENT OFFICE 2,290,239

MILKER CLAW CONSTRUCTION

Floyd G. Hodsdon, Milwaukee, Wis., assignor to International Harvester Company, a corporation of New Jersey Application February 28, 1940, Serial No. 321,194

12 Claims. (Cl. 31—83)

This invention relates to a milker claw construction. More specifically it relates to a milker claw construction which has milk passages intersecting in and opening at the bottom, so that the passages are easily inspected and cleaned.

Because of health regulations, it is necessary that a milker claw be so constructed that the milk passages are easy to clean. A claw which has milk passages intersecting at a common point in an outlet on the under side is both easy to inspect and easy to clean. A milker hose must abut the outlet of the milk passages, and there is a problem of attaching the hose to the claw.

An object of the present invention is to provide an improved milk claw construction.

Another object is the provision of a milker claw which is easy to inspect and to clean.

A further object is to provide a milker claw construction by which a milker hose is held in abutting relationship with a milker claw at a common outlet for the milk passages.

According to the present invention the milk passages of a milker claw intersect in a common outlet on the under side of the claw. A milker hose abuts the common outlet and is held thereagainst by means of a retaining member, which is itself retained by means of outlets from the air passages of the claw.

In the drawing,

Figure 1 is a section through a milker claw of the type which has a single outlet for all air passages;

Figure 2 is a section taken along the line 2—2 of Figure 1;

Figure 3 is a plan view of an alternating type of milker claw, which has two separate outlets for the air passages of the claw;

Figure 4 is a section taken along the line 4—4 of Figure 3; and,

Figure 5 is a section taken along the line 5—5 of Figure 3.

Figure 1 shows in section a milker claw 10 having four air nipples 11 having four passages 12, of which only two are shown. The air passages 12 intersect at a point and communicate with a passageway 14 having an outlet through a tubular member 13 secured in an opening 15 in the claw. The claw has four milker nipples 16 of which only two are shown and a milk passageway 17 for each nipple 16 intersecting in a common outlet 18 at the under side of the claw. It will be appreciated that the intersection of the milk passages 17 in a common outlet at the under side of the claw makes it possible to see through the passages and to clean them easily by insertion of a brush therethrough. This arrangement, of course, requires that a milker hose 19, having a flat end, be abutted against the flat surface shown on the claw 10. The hose 19 is held in abutting relationship with the claw 10 by means of a retaining member 20 which has a central circular portion 21 having an opening 22 therein and hook portions 23 at opposite sides of the central portion. The hose 19 extends through the opening 22 in the retaining member, and the central circular portion 21 rests against a flange 24 on the hose. The hook portion 23 at one side embraces the tubular member 13 constituting an outlet for the air passages. The hook portion 23 at the other side embraces a stud 25 secured to the claw 10. The tubular member 13 and the stud 25 are provided with threaded portions 26 upon which are mounted threaded nuts 27 which urge the hook portions 23 and retaining member 20 toward the claw 10 and thereby hold the hose 19 in abutting relationship with the claw 10. An air hose 28 extends from the tubular member 13.

Figures 3 and 4 show a milker claw 30 which differs from the claw of Figures 1 and 2 in that there is a pair of air outlets rather than a single outlet, and a retaining member for the hose engages the tubular members serving as outlets rather than one tubular member and a stub. The claw 30 has two air nipples 31 having passages 32 intersecting and having a common outlet 33 into a tubular member 34 secured in an opening 35 in the claw. The claw also has a pair of nipples 36 having passages 37 intersecting and having a common outlet 38 into a tubular member 39 secured to the claw in the same manner as the tubular member 34. The claw has four milker nipples 40 having milk passages 41 intersecting in a common outlet 42 on the under side of the claw. A hose 43, having a flange 44, abuts the flat surface of the claw 30 in communication with the outlet 42. A retaining member, like the member 20 shown in Figure 2, holds the hose against the claw 30. The hose extends through an opening in the central circular portion 21 and hook portions 23 embrace the tubular members 34 and 39. Nuts 40 are in threaded engagement with the tubular members and urge the hook portions 23 toward the claw and thereby cause the retaining member 20 to hold the hose 43 in abutting relationship with the claw 30.

As will be observed from Figure 2, it is very easy to attach the hose to the claw. The hose is inserted through the retaining member, and the hose is moved sideways into abutting engagement with the claw at the common outlet for the milk passages, the hook portions being simultaneously brought into engagement with the two tubular outlets for the claw shown in Figures 3 and 4, or the tubular outlet and the stud for the claw shown in Figure 1. Adjustment of the nuts will cause the hose to abut the claw as tightly as may be desired.

It will be apparent from the foregoing description that two novel types of milker claws have been provided, each embodying the same concept of invention. In each, the milk passages intersect in a common outlet at the lower side, and a rubber hose abuts the claw at the outlet. The hose is held in engagement with the claw by means of a retaining member, which, for one type of claw having a single outlet for all air passages, hooks over a tubular member serving as an outlet for the passages and a stud, and which, for another type of claw having two separate outlets for the air passages, hooks over the two tubular members serving as air outlets.

The intention is to limit the invention only within the scope of the appended claims.

What is claimed is:

1. In combination, a milker claw having a plurality of milk passages intersecting in an opening at one side and a plurality of air passages, some of which intersect and have an outlet at one point in said side, others of which intersect and have a separate outlet at another point in said side, externally threaded tubular fittings secured at the outlets, nuts threaded on the fittings, a rubber hose having an external flange and contacting the opening in the side at which the milk passages intersect, and a member having portions surrounding the hose and contacting the flange and hook portions embracing the tubular members and contacting the nuts on the side toward the claw.

2. In combination, a milker claw having milk passages having a common outlet in one side and air passages having a separate common outlet in the said side, a tubular connection secured to the claw at the outlet for the air passages and being externally threaded, nuts threaded on the fittings, a hose having a flange and abutting the said side of the claw in communication with the outlet for the milk passages, and a member having portions surrounding the hose and contacting the flange and other portions hooking around the tubular connection and contacting the nut on the side toward the claw.

3. In combination, a milker claw having milk passages having a common outlet in one side and air passages having a separate common outlet in said side, a tubular connection secured to the claw at the outlet for the air passages, a hose having a flange and abutting the claw in communication with the outlet for the milk passages, a threaded member secured to the said side of the claw, nuts threaded on the tubular connection and the threaded member, and a member having portions surrounding the hose and abutting the flange and other portions hooked around the tubular connections and the threaded member and abutting the nuts on the side toward the claw.

4. In combination, a milker claw having milk passages having a common outlet in one side and air passages, some having one common outlet in the said side spaced in one direction from the outlet for the milk passages, others having another common outlet in the said side spaced in the other direction from the outlet for the milk passages, tubular fitting secured to the claw at the outlets for the air passages and being externally threaded, nuts threaded on the tubular fittings, a hose having a flange and abutting the claw in communication with the outlet for the milk passages, and a member having certain portions surrounding the hose and contacting the flange and other portions of hook shape opening in the same direction, extending around the tubular fittings and contacting the nuts on the side toward the claw.

5. In combination, a milker claw having milk passages having a common outlet in one side and air passages having a separate common outlet in the said side spaced in one direction from the outlet for the milk passages, a tubular fitting secured to the claw at the outlet for the air passages, and being externally threaded, an externally threaded member secured to the said side of the claw at a point spaced from the common outlet for the milk passages in a direction opposite from the common outlet for the air passages, nuts threaded on the member and the tubular fitting, a hose having a flange and abutting the claw in communication with the outlet for the milk passages, and a member having certain portions surrounding the hose and contacting the flange and other portions of hook shape opening in the same direction, extending around the tubular fitting and the threaded member and contacting the nuts on the side toward the claw.

6. In combination, a milker claw having passages having an outlet in one side, a hose having a flange and abutting the claw at the outlet, a member having a portion embracing the hose and contacting the flange and a portion of hook shape, an externally threaded element secured to the claw and extending through the portion of hook shape of the member, and a nut threaded on the element and urging the member and hose toward the claw.

7. In combination, a milker claw having passages having an outlet in one side, a hose abutting the said side of the claw at the outlet and having a flange, a member having central portions embracing the hose and abutting the flange and other portions forming hooks on opposite sides of the central portions, externally threaded elements secured to the said side of the claw on the opposite sides of the outlet and extending through the hooks of the member, and nuts threaded on the elements and urging the member and the hose toward the claw.

8. In combination, a fitting having two outlets in one side, a first tubular element abutting one outlet and having a flange, a second tubular element secured to the claw in communication with the other outlet and having an external thread, a member contacting the flange of the first tubular element, and a nut threaded on the second tubular element and urging the member and the first tubular element toward the fitting.

9. In combination, a fitting having two outlets in one side, a first tubular element abutting one outlet, a second tubular element secured to the fitting at the other outlet, and means retained by the second tubular element for holding the first tubular element against the fitting.

10. In combination, a fitting having three outlets, a first tubular member abutting the middle outlet, a pair of tubular members respectively secured to the two remaining outlets, and means retained by the said pair of tubular members for holding the first tubular member against the fitting.

11. In combination, a fitting having three outlets, a first conduit abutting one outlet, a pair of conduits secured respectively to the two remaining outlets, and a member embracing the first conduit and hooking around the pair of conduits for retaining the first conduit against the fitting.

12. In combination, a fitting having two outlets in one side, a first conduit abutting one outlet, a second conduit secured to the fitting at the other outlet, and means embracing the first conduit and having a hook portion associated with the second conduit for holding the first conduit in contact with the fitting.

FLOYD G. HODSDON.